Sept. 15, 1942.    L. P. LAUFFENBURGER    2,295,996
SPACE ADJUSTER
Filed Oct. 2, 1940    2 Sheets-Sheet 2
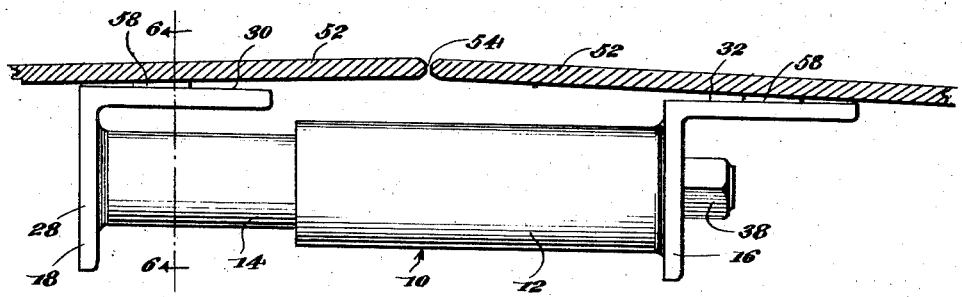
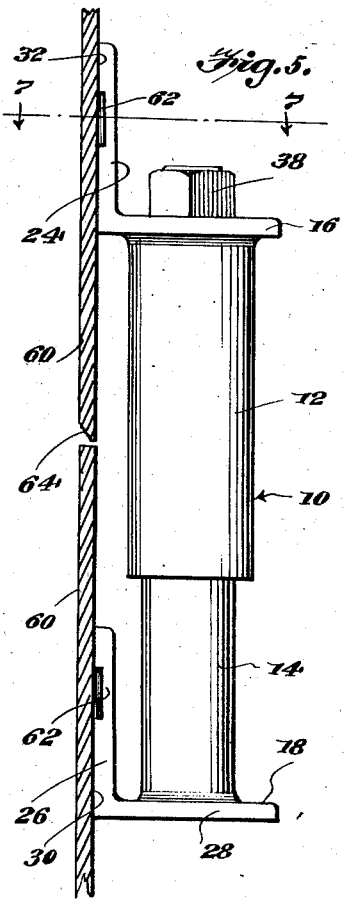
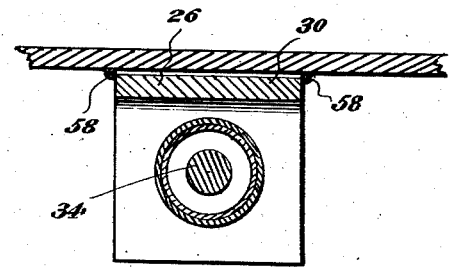
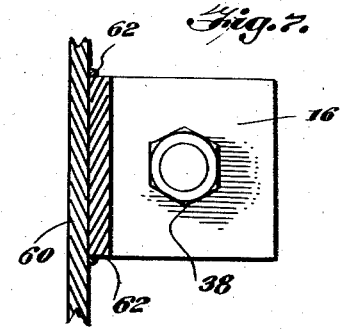
Inventor
LEWIS P. LAUFFENBURGER
By L. Edw. Skehety
Attorney Patented Sept. 15, 1942

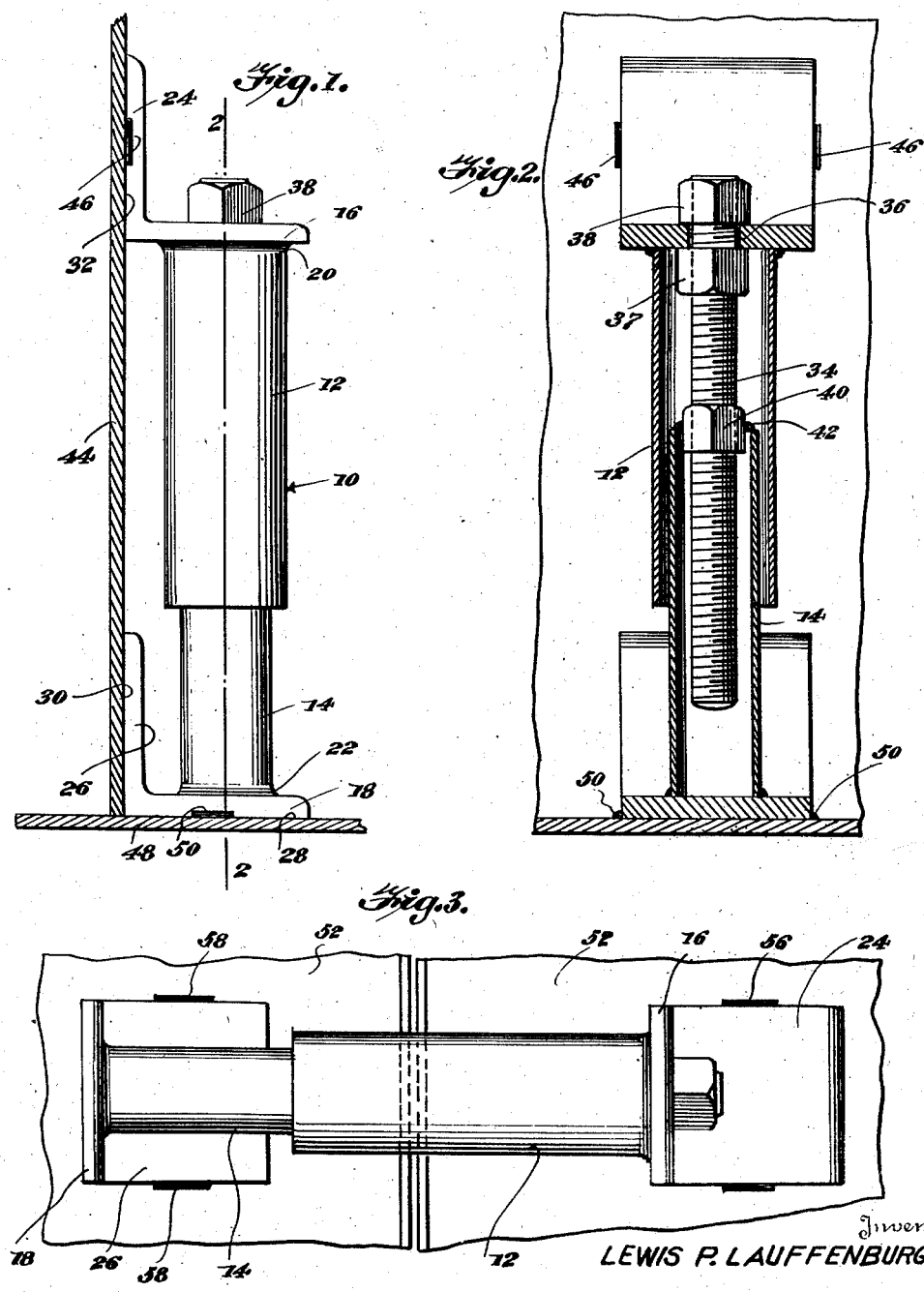

2,295,996

UNITED STATES PATENT OFFICE 2,295,996

SPACE ADJUSTER

Lewis P. Lauffenburger, Bradford, Pa.

Application October 2, 1940, Serial No. 359,452

1 Claim. (Cl. 113—99)

The present invention relates to space adjusters for use in welding.

The primary object of the invention is to provide a space adjuster for holding sheet metal plates to be welded in position for a butt weld whereby, the plates which are heavy and cumbersome will be properly held in position.

A further object of the invention is to provide a space adjuster, the parts of which are protected against sparks and fouling by means of telescopic sleeves surrounding the operative parts of the space adjuster.

A still further object of the invention is to provide a space adjuster which may be readily placed in position prior to the welding operation and which may be easily removed after the completed weld.

Other objects and advantages of the invention will become apparent during the course of the following description of the accompanying drawings wherein:

Figure 1 is a vertical side elevational view of the adjuster illustrating the same in position for holding a pair of sheet metal plates in spaced relation prior to the welding operation.

Figure 2 is a vertical cross sectional view taken on line 2—2 of Figure 1 looking in the direction of the arrows illustrating in detail the operative parts of the space adjuster.

Figure 3 is a front elevational view of the space adjuster showing the same in position for effecting a vertical spacing of a pair of plates to be welded.

Figure 4 is a top plan view of the space adjuster illustrating the same in position for holding a pair of metal plates forming a tank wall in vertically spaced relation.

Figure 5 is a vertical side elevational view of the space adjuster in position upon a pair of metal plates for holding the same in horizontally spaced relation.

Figure 6 is a vertical cross sectional view taken on line 6—6 of Figure 4 looking in the direction of the arrows illustrating the manner in which the space adjuster is welded to the metal plates being spaced or held in a separated position, and Figure 7 is a horizontal cross sectional view taken on line 7—7 of Figure 5 looking in the direction of the arrows further illustrating the manner in which the space adjuster is held in position.

In the drawings, wherein for the purpose of illustrating the invention in detail and wherein like reference characters will be employed to designate like parts throughout the same, the reference character 10 will generally be employed to designate a space adjuster including telescopic sections 12 and 14 to the ends of which are secured angle brackets 16 and 18 by means of spot welding at the respective ends as at 20 and 22.

The space adjuster 10 has the angle portions thereof as at 24 and 26 extending in the same direction so that the angle bracket 18 presents two surfaces 28 and 30 for attachment to the metal plates to be spaced while the angle bracket 16 provides one face for welding engagement with a metal plate to be spaced.

As shown clearly in Figure 2, a screw threaded rod 34 has one of its ends swiveled in an opening 36 in the angle bracket 16 and is held in swiveled relation therewith by means of a pair of nuts 38 and 40 threaded on the rod 34 and welded or otherwise secured in place thereon in spaced relation on opposite sides of the angle bracket.

The opposite end of the screw threaded rod 34 extends into the tubular section 14 and is threaded in a nut 40 held in position in the upper end of the tubular section by means of welding as at 42. Rotation of the nut 38 will cause the rotation of the screw threaded rod 34 to separate the tubular telescoped sections 12 and 14 or contract them as desired and in forming a weld joint as shown in Figures 1 and 2, the bracket 16 has its face 32 welded to a vertical tank plate 44 as at 46 on opposite sides of the angle extension 24. The area of the spot weld 46 may be great enough to securely anchor the angle bracket extension 24 in position. The opposite angle bracket 18 may be secured to a bottom wall 48 of the tank by spot welding the abutting face 28 thereto as at 50.

In Figures 3 and 4, the space adjuster is attached to a pair of sheet metal tank side wall plates 52 so that the ends thereof will be held in spaced relation as at 54. When the space adjuster is employed for holding a pair of metal plates in vertically spaced relation, the angle bracket extensions 24 and 26 are welded to the respective plates by spot welds as at 56 and 58 respectively and in this position, the angle bracket faces 30 and 32 are employed.

When the space adjuster is positioned for holding a pair of metal tank plates in vertically spaced relation as shown in Figures 5 and 7, the angle brackets 16 and 18 have their faces 30 and 32 secured to the metal plate 60 by spot welding as at 62 applied on opposite sides of the angle bracket extensions 24 and 26 to securely hold the space adjuster in position so that the plate 60 will be held in vertically spaced relation as at 64.

After the space adjuster 10 has been attached to the metal plates, the nut head 38 of the screw threaded rod 34 is rotated to increase or decrease the size of the space between the complementary edges of the metal plates to be welded.

It is to be understood that the forms of the invention herewith shown and described are to be taken as preferred embodiments thereof and that various changes in he shape, size and arrangement of parts may be resorted to without departing from the spirit of the invention or the scope of the subjoined claim.

What is claimed is:

A space adjuster for holding a pair of metal plates in position for being welded, comprising a pair of angle brackets adapted to be secured to the metal plates on opposite sides of the joint, a tubular section secured to one of the angle brackets, a screw threaded shaft carried by the other angle bracket and being threaded in the tubular section and a second tubular section carried by the last mentioned bracket adapted to be telescoped over the first mentioned tubular section.

LEWIS P. LAUFFENBURGER.